Patented May 13, 1952

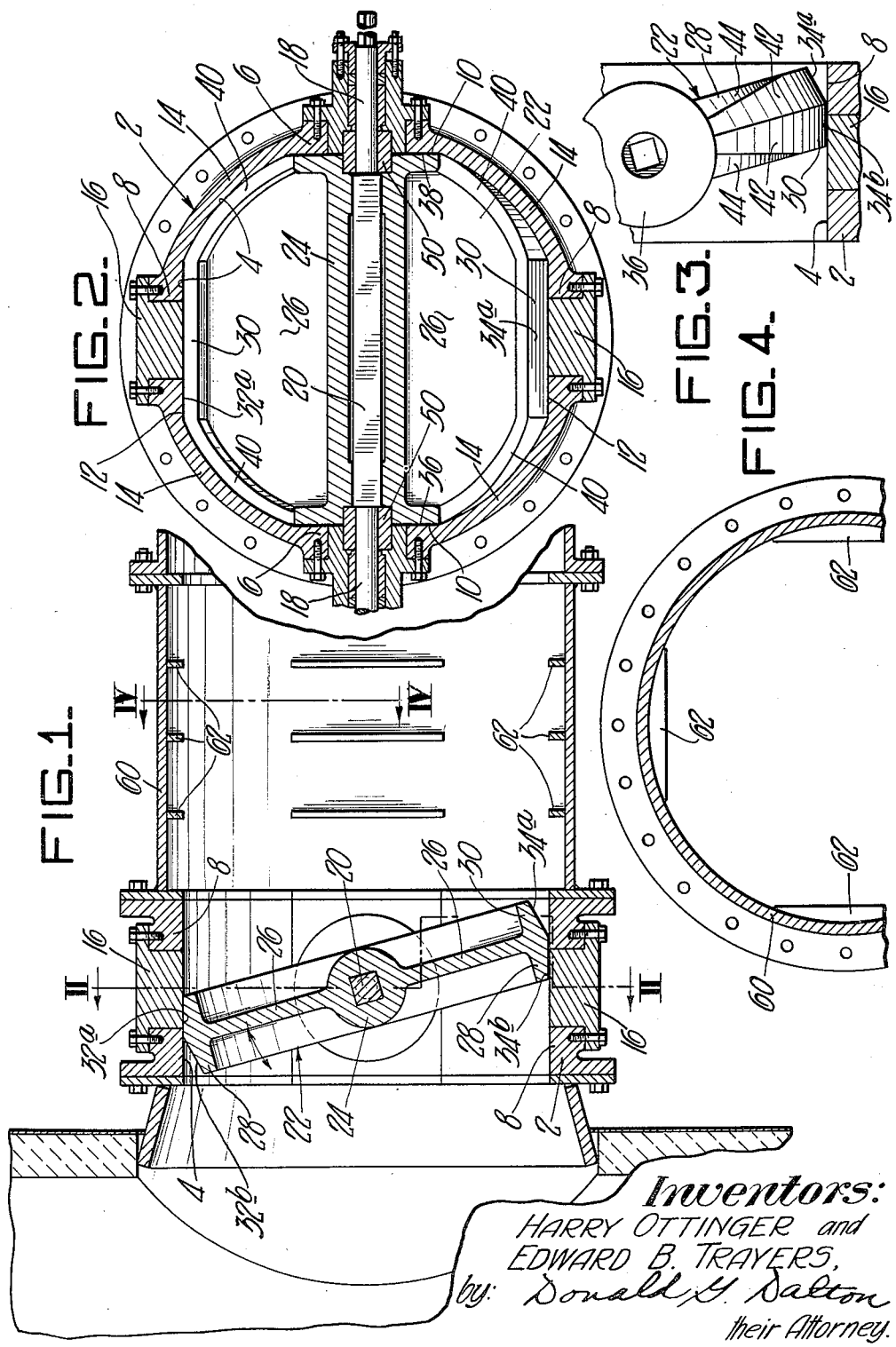

2,596,787

UNITED STATES PATENT OFFICE 2,596,787

BUTTERFLY VALVE

Harry Ottinger, McKeesport, and Edward B. Trayers, Duquesne, Pa., assignors to United States Steel Company, a corporation of New Jersey Application November 2, 1945, Serial No. 626,340

7 Claims. (Cl. 251—11)

This invention relates to improvements in valves and more particularly to improvements in butterfly valves for controlling the flow of solid-containing fluids such as blast furnace gases.

Controlling the flow of fluids, especially solid-containing fluids, involves rapid wear or erosion of the flow-controlling valve and parts thereof. Since the lines of flow through a conduit are not uniform, the wear on the valve or parts thereof is not uniform which frequently necessitates discarding the valve when only a localized area thereof has been eroded. This is particularly true of the butterfly valves used to control the flow of blast furnace gases. A portion of such gases are used and the rest permitted to flow to a bleeder-stack where they escape to the atmosphere for burning. The function of the butterfly or bleeder valve is to control or regulate the pressure or flow of the gas and not to act as a stop valve. Therefore, complete sealing of the valve is not essential and leakage past the valve is tolerated. At no time however, is it permitted for the gas to find a passage through the walls of the valve and escape to the atmosphere at such point. While the blast furnace gases are partially cleaned as they leave the furnace, there is considerable fine ore and other dust therein which acts like a sand blast, cutting brick and steel alike. Consequently, the erosion of the valve parts by such flow is very severe. Since the pressure of the gases coming from the blast furnace almost constantly varies, the butterfly or valve must shift to overcome such pressure change so that it is almost constantly moving, which creates quite a bearing problem.

A primary object of the present invention is to provide improvements in butterfly valves for controlling fluid flow, especially of solid-containing fluids.

A further object of the present invention is to provide a butterfly valve for controlling the flow of blast furnace gases.

Another object is to provide a butterfly valve having a plate and housing that can be used in a plurality of positions.

Still another object is to provide a butterfly valve having protected and replaceable bearings.

Still another object of the present invention is to provide a butterfly valve which is simple in design and durable in use.

The foregoing and further objects will be apparent from the specification and drawing, wherein:

Figure 1 is a longitudinal section of a butterfly valve and housing embodying the teachings of our invention;

Figure 2 is a vertical section on line II—II of Figure 1;

Figure 3 is an elevation; and

Figure 4 is a vertical section on line IV—IV of Figure 1.

Referring more particularly to the drawing, the numeral 2 designates a generally cylindrical valve body having a valve seat facing or lining 4. Two pairs of opposite trunnion bearing openings 6 and 8 are provided in the valve body and the lining 4 is provided with opositely disposed flat zones 10 and 12 extending on either side of the bearing openings. Connecting the flat zones 10 and 12 are arcuate sections 14. The pair of trunnion bearing openings not in use at any time are closed by suitable plugs 16. As a portion of the valve body, which is in the zone of maximum abrasion, becomes worn, it can be rotated 90° on its longitudinal axes and a different part brought to that zone. This can be done three times so that there are four positions in which the valve body can be used. In addition, it can be turned end for end thereby increasing to eight the number of positions or portions that can be brought into the zone of maximum abrasion.

Rotatably mounted in the valve housing 2 on trunnions 18 on shaft 20 is a butterfly valve 22. The butterfly valve 22 has a hub 24 extending thereacross in which the shaft 20 is mounted, and a web 26 on either side of the hub having integral flanges 28 and 30. Oppositely disposed portions 32a, 32b and 34a, 34b of the flanges are flattened over a length substantially equal to the flat surfaces 10 and 12 adjacent the trunnion bearings 6 and 8 of the body 2. The mid-portions of these surfaces are about 90° removed from the outer ends of the hub 24. Connecting the flat zones 32a, 32b, 34a, and 34b to flattened hub sections 36 and 38 are arcuate portions 40 which are cylindrical in zones 42 and spherical in zones 44. This geometric construction allows the butterfly to fit snugly in the cylindrical valve body and bear along the full perimeter when closed. Due to the bevel of the flanges, the butterfly seats normally at an angle of about 15° to the vertical so that it can be opened and closed without fouling. By turning the butterfly about 150°, the flanges 32b and 34a can be brought into sealing position. By turning the butterfly end for end on its axis, the flange 34a can be placed in the high position for sealing and flange 32b in the low position, and by rotating the butterfly 150°, flange 34b can be brought to the high and flange 32a to the low position, making a total of four different positions for operating the butterfly using trunnion bearings 8—8. By using trunnion bearings 6—6 another four positions are available, making a total of eight positions.

Shaft trunnions 18 are preferably provided with oversized sleeves 50 to protect them from abrasion by the gas flow. These sleeves may be coated with Stellite or other extremely hard and abrasion resistant material. The shaft is further protected due to the flat surfaces 36 and 38 which cooperate with the flat surfaces of the butterfly to restrict the gas flow around the shaft.

Disposed in front of the valve and housing is a spacer or filler piece 60 which has a plurality of ribs 62. These ribs 62 are designed to absorb the abrasive action of the flowing gases and protect the perimeter or outer edge portions of the butterfly and housing.

While we have shown and described one specific embodiment of our invention, it will be understood that this embodiment is merely for the purpose of illustration and description and that various other forms may be devised within the scope of our invention, as defined in the appended claims.

We claim:

1. A valve comprising a tubular housing having a substantially smooth longitudinally extending inner surface, said housing having oppositely disposed substantially circular flat surface portions on the inner surface thereof and oppositely disposed arcuate inner surface portions connecting said flat portions, said housing having bearing openings in said flat portions, a disc-like valve member having circular hub portions disposed closely adjacent the flat portions of said housing, a shaft extending through said hub portions into said bearing openings to pivotally mount said valve member in said housing, said valve member having arcuate portions and flat portions disposed in cooperative relationship with the arcuate portions and flat portions of said housing, said valve member having peripheral flanges extending outwardly therefrom on both sides thereof between the flat hub portions, the outer surface of said flanges being inwardly bevelled on both sides of the center thereof, each of said bevelled surfaces having a triangular-like spherical-surfaced portion at the outer side thereof with the base of the triangular-like portion adjacent the hub portions, the balance of said bevelled surfaces being substantially cylindrical, the diameter of said flanged portion of said valve member being slightly larger than the interior of said housing whereby the diagonally opposite bevelled sides of said flange are adapted to seat in said housing.

2. A valve comprising a tubular housing, said housing having two pairs of equally spaced diametrically oppositely disposed flat surface portions on the inner surface thereof, the interior of said housing providing connecting portions between said flat portions, said housing having bearing openings in said flat surface portions, the center of said openings being disposed in a plane transverse to the longitudinal centerline of said housing, one pair of said diametrically oppositely disposed flat surface portions having plug members in said bearing openings having inner surfaces in the same plane as the flat inner surfaces of said housing, a disc-like valve member having two pairs of oppositely disposed flat surfaces and connecting portions of similar shape as the connecting portion of the housing, said flat surfaces and connecting portions having a cooperative sealing relationship with the inner surface of the housing, said disc being pivotally mounted on a shaft extending through the bearing openings of the other pair of said flat surfaces in said housing.

3. A valve comprising a tubular housing, said housing having two pairs of equally spaced diametrically oppositely disposed flat surface portions on the inner surface thereof, the interior of said housing providing connecting portions between said flat portions, said housing having bearing openings in said flat surface portions, the center of said openings being disposed in a plane transverse to the longitudinal centerline of said housing, one pair of said diametrically oppositely disposed flat surface portions having plug members in said bearing openings having inner surfaces in the same plane as the flat inner surfaces of said housing, a disc-like valve member having two pairs of oppositely disposed flat surfaces and connecting portions of similar shape as the connecting portion of the housing, said flat surfaces and connecting portions having a cooperative sealing relationship with the inner surface of the housing, said disc being pivotally mounted on a shaft extending through the bearing openings of the other pair of said flat surfaces of said housing, said valve member having peripheral flanges extending outwardly therefrom on both sides thereof between the flat portions through which said shaft extends, the outer surfaces of said flanges being inwardly bevelled on both sides of the centerline thereof, each of said bevelled surfaces having a triangular-like spherical portion at its outer side with the base of the triangular-like portion adjacent said hub portions, the balance of said bevelled surfaces being substantially cylindrical, the diameter of the cylindrical portions of said flanges being slightly larger than the interior of said housing whereby the diagonally opposite sides of said flange are adapted to seat in said housing.

4. A valve comprising a tubular housing having a substantially smooth longitudinally extending inner surface, said housing having two pairs of equally spaced diametrically oppositely disposed substantially circular flat surface portions on the inner surface thereof, the interior of said housing providing arcuate connecting portions between said flat portions, said housing having bearing openings in said flat surface portions, the center of said openings being disposed in a plane transverse to the longitudinal centerline of said housing, one pair of said diametrically oppositely disposed flat surface portions having plug members in said bearing openings having inner surfaces in the same plane as the flat inner surface portions of said housing, a disc-like valve member having substantially circular hub portions disposed closely adjacent the other pair of said flat portions in said housing, said valve member being pivotally mounted on a shaft extending into the bearing openings in the adjacent flat surfaces of the housing, said valve member having oppositely disposed flat and arcuate connecting surfaces in cooperative sealing relationship with the like inner surfaces of said housing.

5. A valve comprising a tubular housing having a substantially smooth longitudinally extending inner surface, said housing having two pairs of equally spaced oppositely disposed substantially circular flat surface portions on the inner surface thereof, the interior of said housing providing arcuate connecting portions between said flat portions, said housing having bearing openings in said flat surface portions, one pair of said oppositely disposed flat surface portions having plug members in said bearing openings having inner surfaces in the same plane as the flat inner surface portions of said housing, a disc-like valve member having substantially circular hub portions disposed closely adjacent the other pair of said flat portions in said housing, said valve member being pivotally mounted on a shaft extending into the bearing openings in the adjacent flat surface portions of the housing, said valve having oppositely disposed flat and arcuate flanged connecting surfaces in cooperative sealing relationship with the like inner surfaces of said housing, the outer surfaces of said flanged surfaces being inwardly bevelled on both sides of the center thereof, the diameter of the flanged portion of the valve member being slightly larger than the interior of said housing whereby the bevelled sides of said flange are adapted to seat on the smooth longitudinally extending inner surface of said housing.

6. A valve comprising a tubular housing having a substantially smooth longitudinally extending inner surface, said housing having two pairs of equally diametrically oppositely disposed substantially circular flat surface portions on the inner surface thereof, the interior of said housing providing arcuate connecting portions between said flat portions, said housing having bearing openings in said flat surface portions, the center of said openings being disposed in a plane transverse to the longitudinal centerline of said housing, one pair of said diametrically oppositely disposed flat surface portions having plug members in said bearing openings having inner surfaces in the same plane as the flat inner surface portions of said housing, a disc-like valve member having substantially circular hub portions disposed closely adjacent the other pair of said flat portions in said housing, said valve member being pivotally mounted on a shaft extending into the bearing openings in the adjacent flat surface portions of the housing, said valve member having oppositely disposed flat and arcuate flanged connecting surfaces in cooperative sealing relationship with the like inner surfaces of said housing, the outer surfaces of said flanged surfaces being inwardly bevelled on both sides of the center thereof, the diameter of the flanged portion of the valve member being slightly larger than the interior of said housing whereby the diagonally opposite bevelled sides of said flange are adapted to seat on the smooth longitudinally extending inner surface of said housing.

7. A valve comprising a tubular housing having a substantially smooth longitudinally extending inner surface, said housing having two pairs of equally spaced diametrically oppositely disposed substantially circular flat surface portions on the inner surface thereof, the interior of said housing providing arcuate connecting portions between said flat portions, said housing having bearing openings in said flat surface portions, the center of said openings being disposed in a plane transverse to the longitudinal centerline of said housing, one pair of said diametrically oppositely disposed flat surface portions having plug members in said bearing openings having inner surfaces in the same plane as the flat inner surface portions of said housing, a disc-like valve member having substantially circular hub portions disposed closely adjacent the other pair of said flat portions in said housing, said valve member being pivotally mounted on a shaft extending into the bearing openings in the adjacent flat surface portions of the housing, wear-resistant sleeve members disposed on said shaft adjacent each end thereof at the juncture of the flat portions of the housing and the valve member, said valve member having oppositely disposed flat and arcuate flanged connecting surfaces in cooperative sealing relationship with the like inner surfaces of said housing, the outer surfaces of said flanged surfaces being inwardly bevelled on both sides of the center thereof, the diameter of the flanged portion of the valve member being slightly larger than the interior of said housing whereby the diagonally opposite bevelled sides of said flange are adapted to seat on the smooth longitudinally extending inner surface of said housing.

HARRY OTTINGER.
EDWARD B. TRAYERS.

REFERENCES CITED

The following references are of record in the file of this patent:

UNITED STATES PATENTS

| Number | Name | Date |
|---|---|---|
| 630,315 | Barclay | Aug. 8, 1899 |
| 1,402,824 | Wood | Jan. 10, 1922 |
| 1,443,000 | Briggs | Jan. 23, 1923 |
| 1,635,287 | Parker | July 12, 1927 |
| 1,661,190 | Mead | Mar. 6, 1928 |
| 1,682,075 | Foulds | Aug. 28, 1928 |
| 1,860,619 | Pfau | May 31, 1932 |
| 1,935,197 | Williams | Nov. 14, 1933 |
| 2,114,168 | Auger | Apr. 12, 1938 |
| 2,271,390 | Dodson | Jan. 27, 1942 |

FOREIGN PATENTS

| Number | Country | Date |
|---|---|---|
| 7,716 | Great Britain | of 1884 |
| 253,983 | Great Britain | of 1925 |
| 344,549 | Germany | of 1921 |